United States Patent
Prall et al.

(10) Patent No.: US 10,148,485 B2
(45) Date of Patent: Dec. 4, 2018

(54) APPARATUS AND METHOD FOR ON-PROCESS MIGRATION OF INDUSTRIAL CONTROL AND AUTOMATION SYSTEM ACROSS DISPARATE NETWORK TYPES

(71) Applicant: Honeywell International, Inc., Morristown, NJ (US)

(72) Inventors: John M. Prall, Cave Creek, AZ (US); Paul F. McLaughlin, Ambler, PA (US); Michael E. Novak, Scottsdale, AZ (US); Jay W. Gustin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 703 days.

(21) Appl. No.: 14/476,355

(22) Filed: Sep. 3, 2014

(65) Prior Publication Data

US 2016/0062350 A1    Mar. 3, 2016

(51) Int. Cl.
 *G05B 11/01* (2006.01)
 *H04L 12/24* (2006.01)
 (Continued)

(52) U.S. Cl.
 CPC ...... *H04L 41/042* (2013.01); *G05B 19/41855* (2013.01); *H04L 12/462* (2013.01);
 (Continued)

(58) Field of Classification Search
 CPC ............... G06F 11/2005; G06F 9/4405; G05B 19/0421; G05B 19/042; G05B 19/4183;
 (Continued)

(56) References Cited

U.S. PATENT DOCUMENTS 4,607,256 A * 8/1986 Henzel ............... G06F 11/2005
 340/9.1
4,679,189 A   7/1987 Olson et al.
 (Continued)

FOREIGN PATENT DOCUMENTS

DE    4134207 C1    4/1993
DE    103 14 721 A1   11/2004
 (Continued)

OTHER PUBLICATIONS

International Search Report and Written Opinion issued for PCT/US2015/046730 dated Dec. 24, 2015, 14 pgs.
 (Continued)

*Primary Examiner* — Tuan Vu

(57) ABSTRACT

An apparatus includes a first network controller configured to communicate over a higher-level industrial process control network, a second network controller configured to communicate over a first lower-level industrial process control network, and a third network controller configured to communicate over a second lower-level industrial process control network. The first network controller is configured to provide first data messages from the higher-level control network to the second and third network controllers for transmission over the lower-level control networks. The second and third network controllers are configured to provide second data messages from the lower-level control networks to the first network controller for transmission over the higher-level control network. Each of the second and third network controllers is configured to provide third data messages from one of the lower-level control networks to another of the second and third network controllers for transmission over another of the lower-level control networks.

20 Claims, 8 Drawing Sheets

(51) Int. Cl.
*G05B 19/418* (2006.01)
*H04L 12/46* (2006.01)

(52) U.S. Cl.
CPC .......... *G05B 2219/25428* (2013.01); *G05B 2219/31115* (2013.01); *Y02P 90/185* (2015.11)

(58) Field of Classification Search
CPC ..... H04L 29/06; H04L 67/10; H04L 67/1097; H04L 41/042; H04L 41/0226; F16F 15/02
See application file for complete search history.

(56) References Cited

U.S. PATENT DOCUMENTS

| | | | |
|---|---|---|---|
| 5,146,401 A | 9/1992 | Bansal et al. | |
| 5,379,278 A * | 1/1995 | Safadi | G06F 11/2005 370/221 |
| 5,537,414 A | 7/1996 | Takiyasu et al. | |
| 5,566,356 A | 10/1996 | Taketsugu | |
| 5,664,195 A | 9/1997 | Chatterji | |
| 5,749,053 A | 5/1998 | Kusaki et al. | |
| 5,898,826 A | 4/1999 | Pierce et al. | |
| 6,141,769 A | 10/2000 | Petivan et al. | |
| 6,192,232 B1 | 2/2001 | Iseyama | |
| 6,256,297 B1 | 7/2001 | Haferbeck et al. | |
| 6,266,726 B1 * | 7/2001 | Nixon | G05B 19/0421 710/105 |
| 6,292,905 B1 | 9/2001 | Wallach et al. | |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Saleh et al. | |
| 6,917,584 B2 | 7/2005 | Kuwabara | |
| 6,963,761 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,190,961 B2 | 3/2007 | Burr | |
| 7,203,743 B2 | 4/2007 | Shah-Heydari | |
| 7,236,987 B1 | 6/2007 | Faulkner et al. | |
| 7,240,188 B2 | 7/2007 | Takata et al. | |
| 7,275,157 B2 | 9/2007 | Winget | |
| 7,366,114 B2 | 4/2008 | Park et al. | |
| 7,440,735 B2 | 10/2008 | Karschnia et al. | |
| 7,460,865 B2 | 12/2008 | Nixon et al. | |
| 7,620,409 B2 | 11/2009 | Budampati et al. | |
| 7,688,802 B2 | 3/2010 | Gonia et al. | |
| 7,802,016 B2 | 9/2010 | Eimers-Klose et al. | |
| 8,108,853 B2 | 1/2012 | Bale et al. | |
| 8,498,201 B2 | 7/2013 | Budampati et al. | |
| 8,705,527 B1 | 4/2014 | Addepalli et al. | |
| 8,756,412 B2 | 6/2014 | Pulini et al. | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0176396 A1 | 11/2002 | Hammel et al. | |
| 2003/0003912 A1 | 1/2003 | Melpignano et al. | |
| 2003/0005149 A1 | 1/2003 | Haas et al. | |
| 2003/0177150 A1 | 9/2003 | Fung et al. | |
| 2003/0212768 A1 | 11/2003 | Sullivan | |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0030664 A1 * | 2/2004 | Kotoulas | F16F 15/02 706/22 |
| 2004/0083833 A1 | 5/2004 | Hitt et al. | |
| 2004/0174829 A1 | 9/2004 | Ayyagari | |
| 2004/0230899 A1 | 11/2004 | Pagnano et al. | |
| 2004/0254648 A1 * | 12/2004 | Johnson | G05B 19/042 700/1 |
| 2004/0259533 A1 | 12/2004 | Nixon et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0201349 A1 | 9/2005 | Budampati | |
| 2005/0228509 A1 | 10/2005 | James | |
| 2005/0232285 A1 * | 10/2005 | Terrell | H04L 67/1097 370/401 |
| 2005/0254653 A1 | 11/2005 | Potashnik et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104301 A1 | 5/2006 | Beyer et al. | |
| 2006/0128349 A1 | 6/2006 | Yoon | |
| 2006/0171344 A1 | 8/2006 | Subramanian et al. | |
| 2006/0171346 A1 | 8/2006 | Kolavennu et al. | |
| 2006/0209785 A1 * | 9/2006 | Iovanna | H04L 29/06 370/351 |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarinejad | |
| 2007/0112447 A1 * | 5/2007 | McGreevy | G05B 19/4183 700/83 |
| 2007/0147294 A1 | 6/2007 | Bose et al. | |
| 2007/0153677 A1 | 7/2007 | McLaughlin et al. | |
| 2007/0153789 A1 | 7/2007 | Barker, Jr. et al. | |
| 2007/0155423 A1 | 7/2007 | Carmody et al. | |
| 2007/0229231 A1 | 10/2007 | Hurwitz et al. | |
| 2007/0237137 A1 | 10/2007 | McLaughlin | |
| 2007/0244571 A1 | 10/2007 | Wilson et al. | |
| 2007/0261052 A1 | 11/2007 | Bale et al. | |
| 2007/0280178 A1 | 12/2007 | Hodson et al. | |
| 2008/0043637 A1 | 2/2008 | Rahman | |
| 2008/0140844 A1 | 6/2008 | Halpern | |
| 2008/0267259 A1 | 10/2008 | Budampati et al. | |
| 2008/0273547 A1 | 11/2008 | Phinney | |
| 2009/0022121 A1 | 1/2009 | Budampati et al. | |
| 2009/0034441 A1 | 2/2009 | Budampati et al. | |
| 2009/0060192 A1 | 3/2009 | Budampati et al. | |
| 2009/0086692 A1 | 4/2009 | Chen | |
| 2009/0109889 A1 | 4/2009 | Budampati et al. | |
| 2009/0138541 A1 | 5/2009 | Wing et al. | |
| 2010/0042869 A1 | 2/2010 | Szabo et al. | |
| 2010/0128699 A1 | 5/2010 | Yang et al. | |
| 2010/0287548 A1 | 11/2010 | Zhou et al. | |
| 2011/0305206 A1 | 12/2011 | Junell et al. | |
| 2012/0101663 A1 | 4/2012 | Fervel et al. | |
| 2012/0117416 A1 | 5/2012 | McLaughlin | |
| 2012/0275465 A1 * | 11/2012 | Gale | H04L 41/042 370/419 |
| 2013/0117766 A1 * | 5/2013 | Bax | G06F 9/4405 719/323 |
| 2013/0297748 A1 | 11/2013 | Wilson et al. | |

(56) References Cited

U.S. PATENT DOCUMENTS

2016/0065656 A1\* 3/2016 Patin .................. H04L 67/10
709/201

FOREIGN PATENT DOCUMENTS

| EP | 1 081 895 A1 | 3/2001 |
|---|---|---|
| EP | 1 401 171 A2 | 3/2004 |
| EP | 1 439 667 A2 | 7/2004 |
| GB | 2 427 329 A | 12/2006 |
| WO | WO 01/35190 A2 | 5/2001 |
| WO | WO 03/079616 A1 | 9/2003 |
| WO | WO 2004/047385 A2 | 6/2004 |
| WO | WO 2004/114621 A1 | 12/2004 |
| WO | WO 2006/017994 A1 | 2/2006 |
| WO | WO 2006/053041 A1 | 5/2006 |

OTHER PUBLICATIONS

Saiman Taherian, et al., "Event Dissemination in Mobile Wireless Sensor Networks", 2004 IEEE International Conference on Mobile Ad-Hoc and Sensor Systems, p. 573-575.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

"XYR 5000 Wireless Transmitters, Honeywell Solutions for Wireless Data Acquisiton and Monitoring," www.acs.honeywell.com, Feb. 2006, 6 pages.

Communication pursuant to Article 94(3) EPC dated Apr. 2, 2009 in connection with European Patent Application No. 07 761 784.3.

A. Aiello et al., "Wireless Distributed Measurement System by Using Mobile Devices," IEEE Workshop on Intelligent Data Acquisition and Advanced Computing Systems: Technology and Applications, Sep. 5-7. 2005, Sofia, Bulgaria, pp. 316-319.

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

Pereira, J.M. Dias, "A Fieldbus Prototype for Educational Purposes", IEEE Instrumentation & Measurement Magazine, New York, NY vol. 7, No. 1, Mar. 2004, p. 24-31.

International Search Report and Written Opinion of the International Searching Authority in PCT Application No. PCT/US2006/048334 dated Jul. 5, 2007.

European Search Report dated Oct. 6, 2008 in connection with European Patent Application No. 08 16 1387.

Strilich, et al.; "Gateway Offering Logical Model Mapped to Independent Underlying Networks"; U.S. Appl. No. 14/269,903, filed May 5, 2014; 49 pages.

\* cited by examiner

APPARATUS AND METHOD FOR ON-PROCESS MIGRATION OF INDUSTRIAL CONTROL AND AUTOMATION SYSTEM ACROSS DISPARATE NETWORK TYPES

TECHNICAL FIELD

This disclosure relates generally to industrial process control and automation systems. More specifically, this disclosure relates to an apparatus and method for on-process migration of an industrial control and automation system across disparate network types.

BACKGROUND

Industrial process control and automation systems are typically used to monitor and control complex and potentially volatile industrial processes without interruption, often running without scheduled downtime for years. Over time, a need may arise to upgrade one or more components in an industrial process control and automation system. This could be due to various factors, such as the desire to obtain improvements provided by new products or the need to replace obsolete products or address support issues. It is often necessary or desirable to perform an upgrade "on-process," meaning there are little or no interruptions of the control routines used by the system to control the underlying industrial processes. Ideally, this allows the system to continuously or near-continuously monitor and control the underlying industrial processes during the upgrade.

SUMMARY

This disclosure provides an apparatus and method for on-process migration of an industrial control and automation system across disparate network types.

In a first embodiment, an apparatus includes a first network controller configured to communicate over a higher-level industrial process control network, a second network controller configured to communicate over a first lower-level industrial process control network, and a third network controller configured to communicate over a second lower-level industrial process control network. The first network controller is configured to provide first data messages from the higher-level industrial process control network to the second and third network controllers for transmission over the lower-level industrial process control networks. The second and third network controllers are configured to provide second data messages from the lower-level industrial process control networks to the first network controller for transmission over the higher-level industrial process control network. Each of the second and third network controllers is configured to provide third data messages from one of the lower-level industrial process control networks to another of the second and third network controllers for transmission over another of the lower-level industrial process control networks.

In a second embodiment, a method includes receiving first data messages from a higher-level industrial process control network at a first network controller of an interface device. The method also includes providing the first data messages to second and third network controllers of the interface device for transmission over first and second lower-level industrial process control networks. The method further includes receiving second data messages from the lower-level industrial process control networks at the second and third network controllers. Moreover, the method includes providing the second data messages to the first network controller for transmission over the higher-level industrial process control network. The method also includes receiving third data messages from one of the lower-level industrial process control networks at one of the second and third network controllers. In addition, the method includes providing the third data messages to another of the second and third network controllers for transmission over another of the lower-level industrial process control networks.

In a third embodiment, a system includes first, second, and third network controllers configured to communicate over first, second, and third industrial process control networks, respectively. The system also includes at least one processing device configured to provide a gateway function to allow data messages to be transported between (i) the first industrial process control network and (ii) the second and third industrial process control networks. The second and third network controllers are configured to provide a bridge function to allow data messages to be transported between (i) the second industrial process control network and (ii) the third industrial process control network. In addition, the system includes a bus configured to transport the data messages between the network controllers.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, there is often a need or desire to upgrade one or more components in an industrial process control and automation system, ideally using an "on-process" migration so that monitoring and control of one or more underlying industrial processes is continuous or near-continuous. However, this is often difficult to achieve when a new control network is being installed that is incompatible with a legacy control network. For example, it may be necessary or desirable to minimize the disturbances to control devices being migrated onto the new control network and control devices staying on the legacy control network. Communications between the devices ideally would be maintained at all times to prevent the loss of control or view of the underlying processes throughout the migration. In addition, it is common for a migration to occur over an extended period of time since it is typically rare for all devices to be scheduled for an upgrade at the same time.

In the following description, a "legacy" device refers to a device being replaced by a more recent, enhanced, or other device. A "legacy" protocol refers to a protocol used by a legacy device, a "legacy" interface refers to an interface that supports the use of a legacy protocol, and a "legacy" network refers to a network that supports the use of a legacy protocol. A "new" or "enhanced" device refers to a device that is replacing a legacy device. An "enhanced" protocol refers to a protocol used by a new or enhanced device, an "enhanced" interface refers to an interface that supports the use of an enhanced protocol, and an "enhanced" network refers to a network that supports the use of an enhanced protocol. Note that the terms "migration" and "replacement" (and their derivatives), when used with reference to a legacy device, include both a physical replacement of the legacy device with a new or enhanced device and an upgrade of the legacy device to have one or more features of a new or enhanced device.

Figure 1:
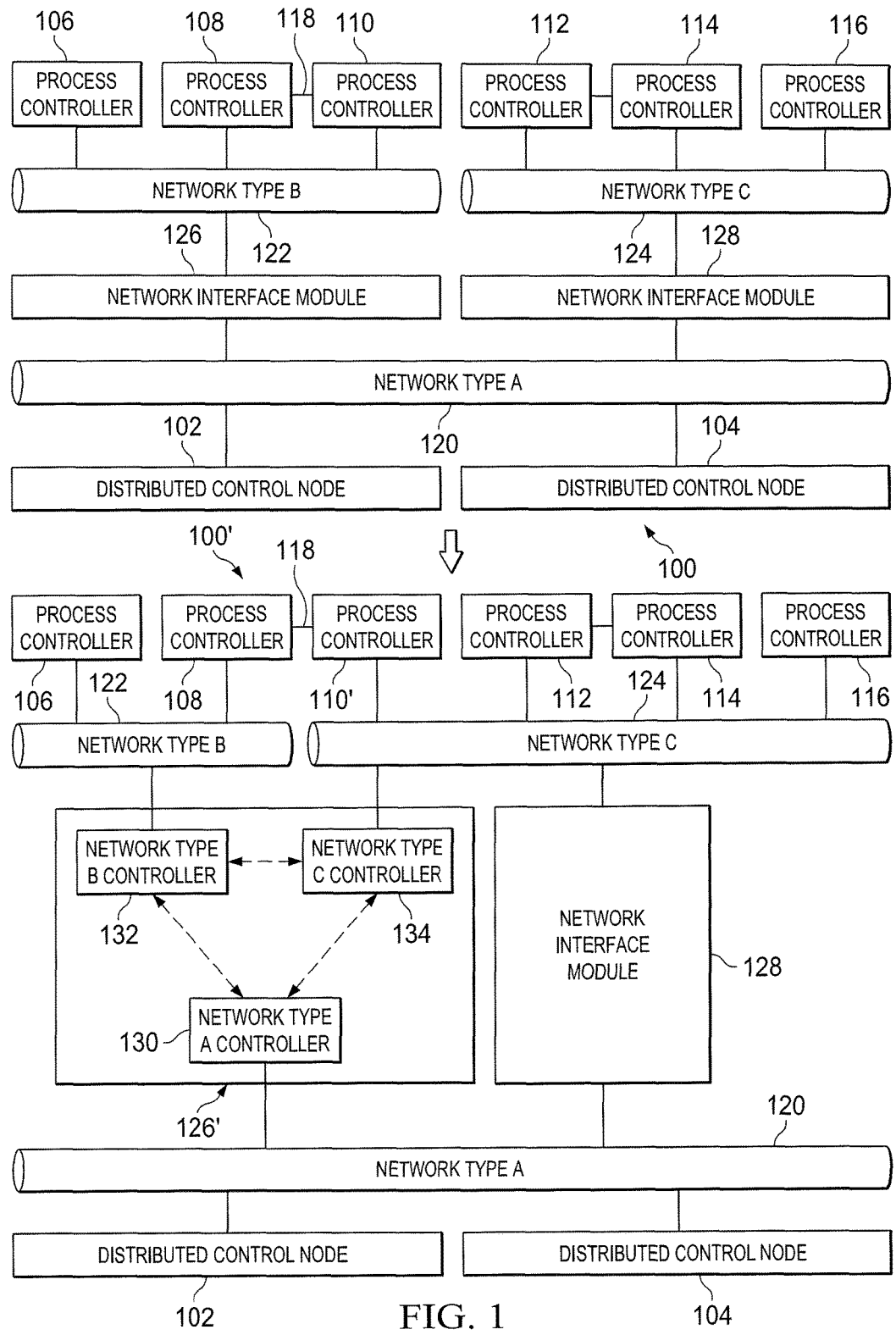
FIG. 1 illustrates an example on-process migration in an industrial process control and automation system according to this disclosure.

FIG. 1 illustrates an example on-process migration in an industrial process control and automation system according to this disclosure. As shown in FIG. 1, an industrial process control and automation system 100 is being modified during the migration to create an updated industrial process control and automation system 100'.

The system 100 here includes two distributed control system (DCS) nodes 102-104. The DCS nodes 102-104 generally represent higher-level controllers or other components in an industrial process control and automation system. For example, the DCS nodes 102-104 could be used to optimize the control logic used by various lower-level process controllers 106-116 or to interact with and use data from the process controllers 106-116. In particular embodiments, the DCS nodes 102-104 reside at "Level 2" or higher in the Purdue model of industrial control. Each DCS node 102-104 represents any suitable structure for performing higher-level functions in an industrial process control and automation system. For instance, each DCS node 102-104 could represent a computing device executing a WINDOWS operating system or other operating system.

The process controllers 106-116 generally represent lower-level controllers that perform lower-level functions in an industrial process control and automation system. For example, the process controllers 106-116 could receive measurements of various characteristics of an industrial process from a number of sensors. The process controllers 106-116 could use the measurements to generate control signals for a number of actuators in the industrial process control and automation system. In particular embodiments, the process controllers 106-116 reside at "Level 1" in the Purdue model of industrial control. Each process controller 106-116 represents any suitable structure for performing process control functions or other lower-level functions in an industrial process control and automation system. For instance, each process controller 106-116 could represent a computing device executing a real-time operating system.

In this example, the process controllers 106 and 116 denote stand-alone controllers, while the process controllers 108-110 and 112-114 denote redundant pairs of controllers. In each redundant pair, one process controller operates in a primary mode, and another process controller operates in a secondary or redundant mode. When in the primary mode, a process controller actively monitors or controls the underlying industrial process(es). When in the secondary mode, a process controller can be synchronized with the primary process controller, which allows the secondary process controller to take over and enter the primary mode if and when the primary process controller fails or another switchover event occurs (such as a user-initiated switchover). A dedicated communication link 118 can be used to couple and allow synchronization of the process controllers in a redundant configuration. The communication link 118 can represent a dedicated point-to-point link and be independent of any other communication or control network in the system.

Different types of control networks 120-124 are used in the system to support communications between controllers and other devices coupled to the networks 120-124. The control network 120 denotes a network supporting communications to and from the DCS nodes 102-104 or other higher-level components of the system. The control network 122 denotes a legacy network supporting communications to and from legacy process controllers 106-110 and other legacy lower-level components of the system. The control network 124 denotes an enhanced network supporting communications to and from enhanced process controllers 112-116 and other enhanced lower-level components of the system.

Each control network 120-124 represents any suitable type of industrial control network. In particular embodiments, the control network 120 denotes a supervisory redundant coaxial network, such as a LOCAL CONTROL NETWORK (LCN) from HONEYWELL INTERNATIONAL INC. Also, in particular embodiments, the control network 122 denotes a legacy coaxial or redundant coaxial network, such as a UNIVERSAL CONTROL NETWORK (UCN) from HONEYWELL INTERNATIONAL INC. In addition, in particular embodiments, the control network 124 denotes one or more Ethernet networks, such as a FAULT TOLERANT ETHERNET (FTE) network from HONEYWELL INTERNATIONAL INC.

The DCS nodes 102-104 cannot communicate and interact with the process controllers 106-116 directly because of the presence of the different control networks 120-124. Instead, various network interface modules (NIMs) 126-128 sit between the DCS nodes 102-104 and the process controllers 106-116. Each NIM 126-128 generally allows devices on one network to communicate with devices on another network.

It may become necessary or desirable to migrate one or more of the legacy process controllers 106-110 onto the enhanced control network 124. In this example, the legacy process controller 110 is being replaced by an enhanced process controller 110'. As noted above, this could be due to various factors, such as the desire to obtain improvements provided by enhanced devices or the need to replace obsolete legacy devices or address support issues with the legacy devices.

When attempting to migrate a redundant pair of process controllers (such as the controllers 108-110), one could simply migrate the secondary legacy process controller 110 to an enhanced process controller 110' on the enhanced network 124. Later, after operation of the enhanced process controller 110' is verified, the other legacy process controller 108 can be migrated onto the enhanced network 124. The enhanced process controller 110' and the legacy process controller 108 could still communicate over their dedicated communication link 118 and be synchronized, but the enhanced process controller 110' no longer has the ability to communicate with other devices (such as the process controller 106) on the legacy control network 122 via peer-to-peer communications. In addition, various data references used by the DCS nodes 102-104 may no longer function properly without modifications that redirect the DCS nodes 102-104 to the enhanced process controller 110'. This breakage in data references in the DCS nodes 102-104 results in a loss of control and view over the industrial process and can make on-process migration of devices on the control network 122 to devices on the control network 124 virtually impossible.

In accordance with this disclosure, at least one NIM 126 is replaced with at least one NIM 126', which can be used to both (i) support communications between a supervisory control network 120 and multiple lower-level control networks 122-124 and (ii) support communications between the multiple lower-level control networks 122-124. The NIM 126' effectively operates as a gateway with respect to the first function since it supports communications between multiple levels of a control and automation system. The NIM 126' effectively operates as a bridge with respect to the second function since it supports communications between components coupled to different networks on the same level of a control and automation system.

As shown in FIG. 1, the NIM 126' includes three network controllers 130-134. Each network controller 130-134 supports communications using the appropriate protocol over one of the control networks 120-124. The network controllers 130-134 also support the gateway and bridge functions of the NIM 126'. For example, the network controller 130 could receive data messages, identify the destinations of the data messages, and send the data messages to the network controllers 132-134 for communication over the appropriate control networks 122-124. The network controllers 132-134 could support similar functions for sending data messages to other network controllers for delivery to the appropriate destinations.

The NIM 126' supports on-process migration in a control and automation system across disparate control network types, such as during the migration of a system from a legacy (generally obsolete) control network 122 to an enhanced control network 124. The NIM 126' generally supports communications over the three disparate networks, each with a different physical implementation. The NIM 126' also supports incremental migration by allowing interaction between higher-level components in the system and both legacy and enhanced devices. This allows the legacy devices to be replaced with enhanced devices over an extended period of time. In addition, the DCS nodes 102-104 can continue to interact with an enhanced device that replaces a legacy device using the same data references since the NIM 126' can be used to access both the legacy device and the enhanced device.

Additional details regarding the use of a NIM 126' to support on-process migration are provided below. Note that while described as being implemented in a NIM, this approach could be used in any other suitable devices, such as a network gateway or other device. Also note that while the NIM 128 is shown here as a standard NIM, the NIM 128 could be upgraded in the same manner as the NIM 126' to communicate over the three control networks 120-124. This could allow the use of a redundant pair of NIMs in the updated industrial process control and automation system 100'.

Although FIG. 1 illustrates one example of an on-process migration in an industrial process control and automation system, various changes may be made to FIG. 1. For example, various components in FIG. 1 could be combined, further subdivided, moved, or omitted and additional components could be added according to particular needs. Also, the system could include any number of each component shown in FIG. 1. Control and automation systems come in a wide variety of configurations, and FIG. 1 does not limit the scope of this disclosure to any particular configuration. In addition, FIG. 1 illustrates one example operational environment in which on-process migration could be supported. This functionality could be used in any other suitable industrial process control and automation system.

FIGS. 2 through 6 illustrate an example device supporting on-process migration in an industrial process control and automation system and related details according to this disclosure. More specifically, FIGS. 2 through 6 illustrate example implementation details of the NIM 126' supporting on-process migration. For ease of explanation, the NIM 126' in FIGS. 2 through 6 is described as being used in the system of FIG. 1. The NIM 126' could be used in any other suitable system to support migration from any suitable legacy devices to any suitable enhanced devices.

Figure 2:
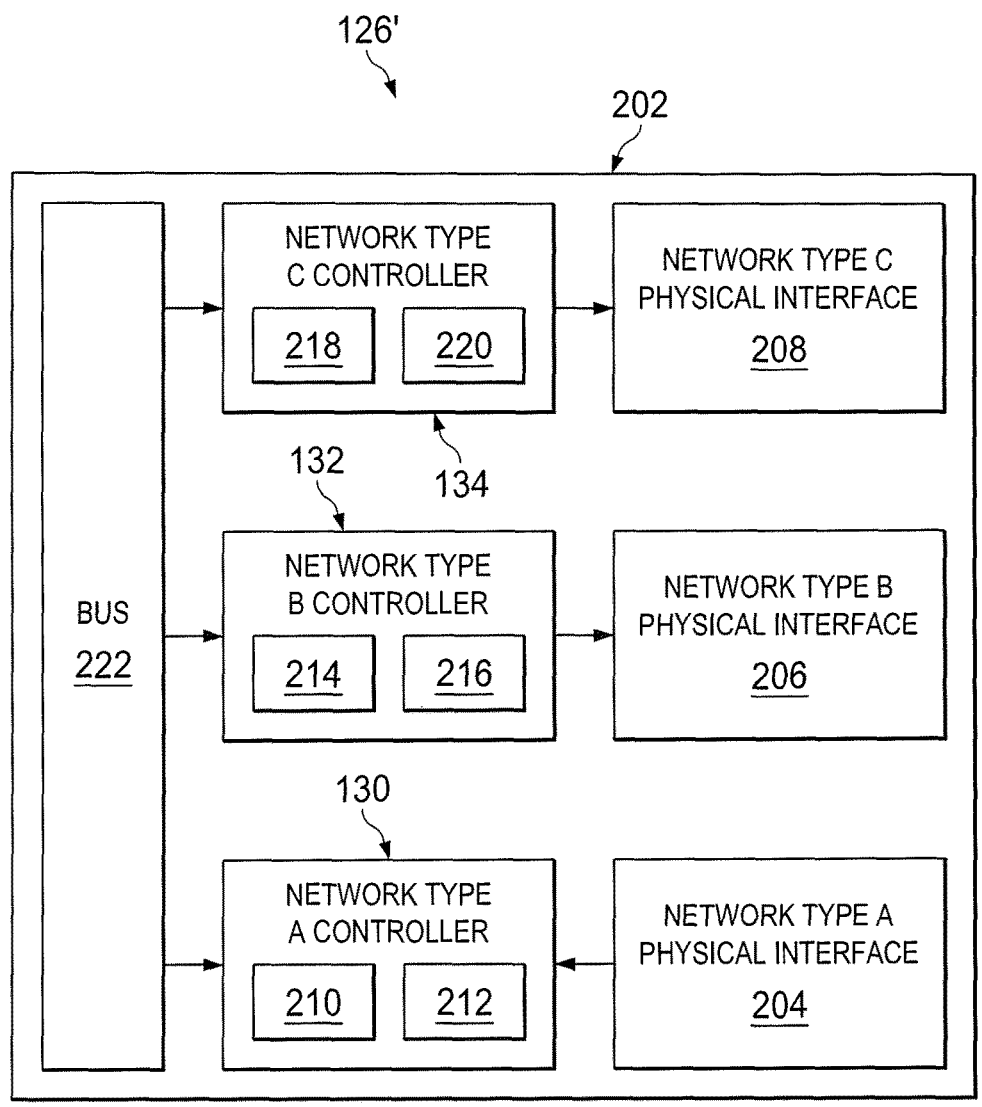
FIGS. 2 through 6 illustrate an example device supporting on-process migration in an industrial process control and automation system and related details according to this disclosure.

As shown in FIG. 2, the NIM 126' includes a housing 202. The housing 202 generally denotes a structure that protects, encases, or holds other components of the NIM 126'. The housing 202 includes any suitable structure in which other components can be placed. The housing 202 could also be formed from any suitable material(s) and in any suitable manner. In particular embodiments, the housing 202 includes a chassis into which printed circuit board (PCB) cards can be inserted and coupled to a backplane or other structure.

The NIM 126' also includes the three network controllers 130-134, which are coupled to three network physical interfaces 204-208. The network controller 130 supports communications over a supervisory network 120, such as an LCN. For example, the network controller 130 can receive data from and transmit data to various DCS nodes 102-104 coupled to the supervisory network 120 using at least one standard or proprietary protocol. The network controller 130 represents any suitable controller for interacting with a supervisory control network. In some embodiments, the network controller 130 includes at least one processing device 210 and at least one memory 212. In particular embodiments, the network controller 130 represents a K4LCN interface card from HONEYWELL INTERNATIONAL INC., with modifications made to the firmware of the card to support various functions of the NIM 126'. The physical interface 204 could represent an Ethernet port or other suitable structure configured to be coupled to the supervisory network 120.

The network controller 132 supports communications over a legacy control network 122, such as a UCN or other coaxial network. For example, the network controller 132 can receive data from and transmit data to various process controllers 106-110 using at least one standard or proprietary legacy protocol. The network controller 132 represents any suitable controller for interacting with a legacy control network. In some embodiments, the network controller 132 includes at least one processing device 214 and at least one memory 216. The physical interface 206 could represent a coaxial cable interface or other suitable structure configured to be coupled to the control network 122.

The network controller 134 supports communications over an enhanced control network 124, such as an FTE network. For example, the network controller 134 can receive data from and transmit data to various process controllers 112-116 using at least one standard or proprietary enhanced protocol. The network controller 134 represents any suitable controller for interacting with an enhanced control network. In some embodiments, the network controller 134 includes at least one processing device 218 and at least one memory 220. The physical interface 208 could represent an FTE interface or other suitable structure configured to be coupled to the control network 124.

Among other things, the NIM 126' can translate between the protocols used by the supervisory network 120, the legacy control network 122, and the enhanced control network 124. This allows legacy devices (such as the process controller 108) to be used while an enhanced device (such as the process controller 110') is being installed, commissioned, and brought online.

The processing device 210 controls the overall operation of the NIM 126'. For example, the processing device 210 could control the operations of the network controllers 130-132 to thereby control the transmission and reception of data by the NIM 126'. Each processing device 210, 214, 218 also supports translation, address resolution, or other operations needed to support the flow of data between different control networks 120-124. For instance, the processing device 210, 214, 218 of each network controller 130-134 can receive incoming data messages at the NIM 126', determine how specific message destinations are to be contacted, and initiate communications to and from other network controllers if needed. Each processing device 210, 214, 218 includes any suitable computing or processing device, such as at least one microprocessor, microcontroller, digital signal processor, field programmable gate array, application specific integrated circuit, or discrete logic device.

Each memory 212, 216, 220 stores instructions or data used, generated, or collected by its associated processing device(s). For example, each memory 212, 216, 220 could store software or firmware instructions executed by its associated processing device(s). Each memory 212, 216, 220 could also store data being transported through the NIM 126'. Each memory 212, 216, 220 includes any suitable volatile and/or non-volatile storage and retrieval device(s), such as at least one random access memory and at least one Flash or other read-only memory.

A bus 222 facilitates communications between the network controllers 130-132. For example, the bus 222 could transport data between different controllers 130-132 to support the exchange of data between multiple control networks 120-124. The bus 222 includes any suitable structure for transporting data between network controllers.

Figure 3:
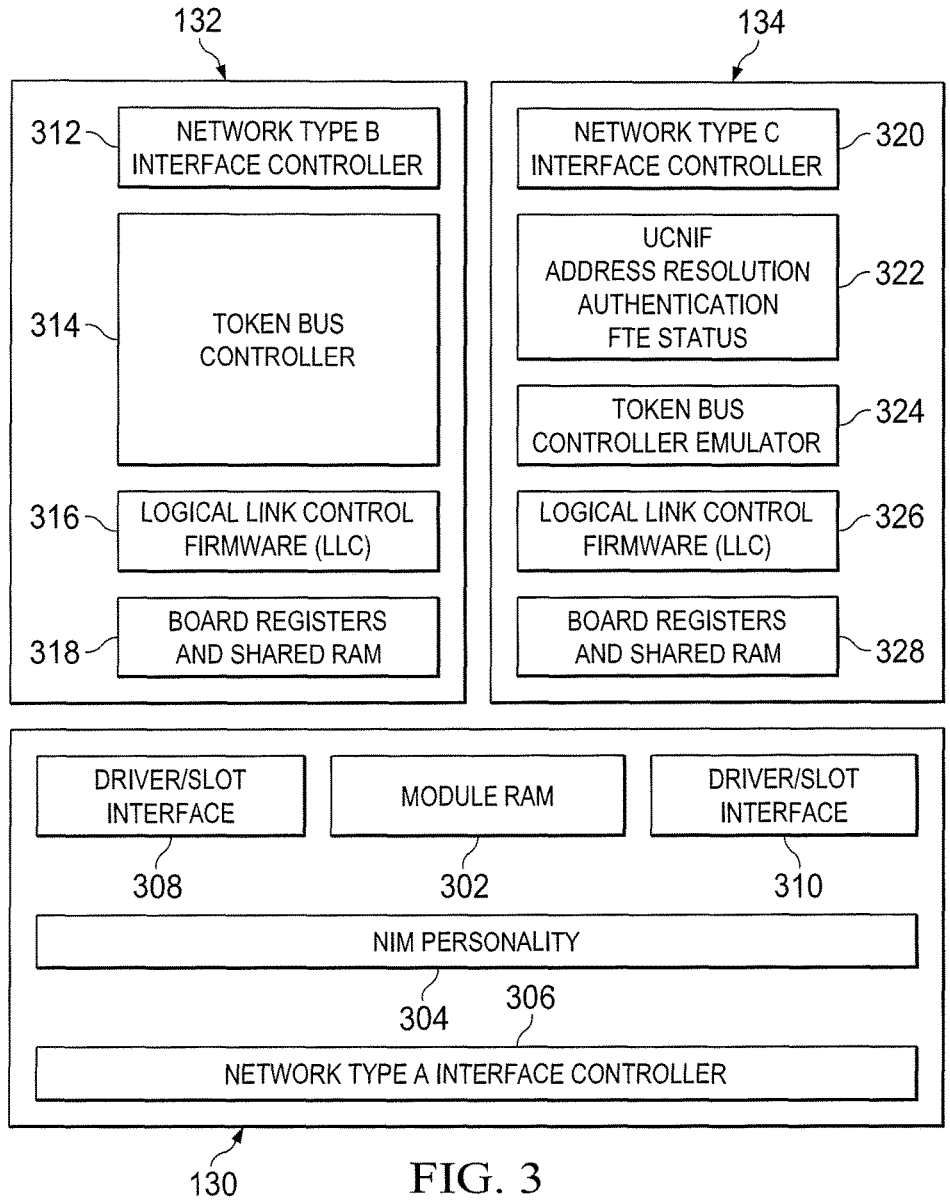

A particular implementation of the network controllers 130-134 is shown in FIG. 3. As shown in FIG. 3, the network controller 130 can include a module RAM 302, which could represent at least part of the memory 212 in the controller 130. The network controller 130 can also include a NIM personality 304 and a network interface controller 306. The NIM personality 304 represents an application or other logic executed by the NIM 126' to provide the desired gateway functionality. The NIM personality 304 could, for instance, represent the code executed by the processing device(s) 210 in the controller 130. The network interface controller 306 supports interactions with the physical interface 204 in order to facilitate communications over an LCN or other supervisory control network 120. The network controller 130 can further include two interfaces 308-310, which facilitate communications with the other network controllers 132-134 via the bus 222. The interfaces 308-310 can denote any suitable interfaces, such as Enhanced Process Network Interface (EPNI) interfaces (where the network controllers 132-134 are implemented using EPNI cards).

The network controller 132 can include a network interface controller 312, which supports interactions with the physical interface 206 in order to facilitate communications over a legacy control network 122. For example, the network interface controller 312 could represent an analog modem that communicates over a coaxial legacy network. The network controller 132 can also include a token bus controller 314, which supports the function of network management and message processing on a UCN or other token bus. In some embodiments, the token bus controller 314 can be placed into a so-called "promiscuous" or other mode of operation in which the token bus controller 314 is able to receive and handle data messages with destination addresses other than the NIM's address (to enable routing of peer-to-peer messages not addressed to the NIM). The network controller 132 can further include logical link control (LLC) firmware 316, which represents code that includes support for the gateway and bridging functions described above. That is, the LLC firmware 316 allows the network controller 132 to exchange data with the network controllers 130, 134 in order to transport data amongst the control networks. In addition, the network controller 132 can include various forms of memory 318, such as registers on a PCB and a shared RAM (which can be accessible by other network controllers).

The network controller 134 can include a network interface controller 320, which supports interactions with the physical interface 208 in order to facilitate communications over an enhanced control network 124. For example, the interface controller 320 could include a network stack and interface supporting communications over an FTE network. The network controller 134 can also include logic 322 supporting various functions related to the enhanced control network 124. For example, UCN interface (UCNIF) logic can help map UCN addresses associated with the control network 122 into Internet Protocol (IP) addresses associated with the control network 124. Address resolution, authentication, and FTE status (heartbeat) functionality could also be used to support the use of an FTE network. A token bus controller emulator 324 emulates the function of network management and message processing on a UCN or other token bus so that the network controller 134 can interact directly with the network controller 132. The network controller 134 can further include LLC firmware 326, which represents code that supports the gateway and bridging functions described above and allows the network controller 134 to exchange data with the network controllers 130-132 in order to transport data amongst the control networks. In addition, the network controller 134 can include various forms of memory 328, such as registers on a PCB and a shared RAM (which can be accessible by other network controllers).

Figure 4:
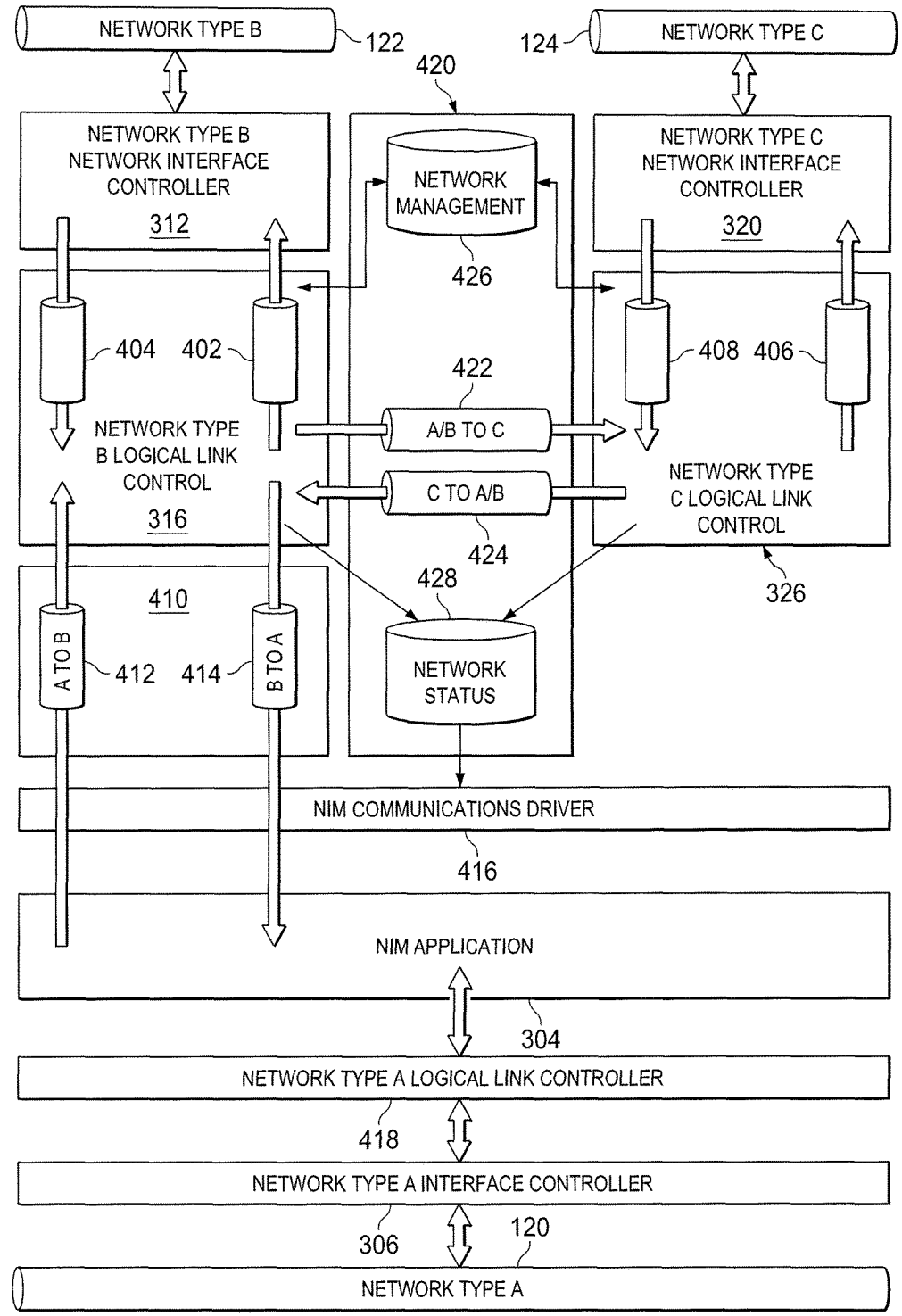

FIG. 4 illustrates example data flows between components of the NIM 126'. As shown in FIG. 4, the network controller 132 includes buffers 402-404, which are used to buffer data transmitted to and received from the control network 122. The data received from the control network 122 could be destined for one or more devices in any of the control networks 120-124. Similarly, the network controller 134 includes buffers 406-408, which are used to buffer data transmitted to and received from the control network 124. Again, the data received from the control network 124 could be destined for one or more devices in any of the control networks 120-124. In addition, a first shared memory block 410 includes buffers 412-414, which are used to buffer data transmitted to and received from the control network 120. Once again, the data received from the control network 120 could be destined for one or more devices in any of the control networks 120-124. Communications with the control network 120 occur via a driver 416, the NIM personality 304 (shown here as an application), a supervisory network LLC layer 418, and the network interface controller 306. The memory block 410 is shared in that it is accessible by both network controllers 130-132. The shared memory block 410 could reside within the network controller 130, such as in a shared RAM of the network controller 130.

A second shared memory block 420 facilitates the exchange of data between the network controllers 132-134 (and indirectly the network controller 130). For example, a buffer 422 is used to buffer data going from the control networks 120-122 to the control network 124, and a buffer 424 is used to buffer data going from the control network 124 to the control networks 120-122. The NIM personality 304 could monitor these buffers 422-424 to identify their status, but it need not process any messages contained in these buffers 422-424 that are being transported between the control networks 122-124. The shared memory block 420 could reside within the network controller 130, such as in a shared RAM of the network controller 130.

The second shared memory block 420 is also used to store a network management database 428 and a network status database 430. The network management database 428 can be used to store various information used by the network controllers 130-134 or other components of a control and automation system, such as information used to map different addresses in different network spaces. The network status database 430 can also be used to store various information used by the network controllers 130-134 or other components of a control and automation system, such as information identifying the status of various components or communication links of the control and automation system.

In some embodiments, the NIM personality 304 can periodically request (via the network controller 132) the status of all legacy devices coupled to the control network 122 and assigned to the NIM 126'. For example, this request could be sent as a UCN Type 3 data request for the AUX STATUS Service Access Point (SAP). A Read Data Response (RDR) from each legacy device contains the current node status of that legacy device. These messages can be used to maintain a first Route Table in the network management database 428 or the network status database 430. Also, the network controller 134 can listen for periodic or on-change IP multicast or other annunciations of the node status for enhanced devices on the control network 124. These annunciations can be used to populate a second Route Table in the network management database 428 or the network status database 430.

In some embodiments, one or both of the databases 428-430 can be maintained in multiple locations within the NIM 126'. For example, one or more address resolution tables that identify the nodes identified on the enhanced network 124 can be maintained in the memory of the network controller 134 and copied to the second shared memory block 420 for use by the network controller 132. Similarly, the LLC layer 316 of the network controller 132 can maintain a list of nodes on the control network 122 and can copy this list to the second shared memory block 420 for use by the network controller 134.

Note that in this example, traffic between the control networks 120 and 124 appears to pass through the network controller 132 for the control network 122. This is done so that the enhanced process controllers 112-116 appear (from the perspective of DCS nodes 102-104 or other higher-level devices) to reside on the legacy network. This also allows the network controller 132 to function as the "master" for network communications over the control networks 122-124. This may be beneficial since it allows the network controller 132 to control cable swapping and time synchronization on the control network 122 while transferring data messages into and out of various buffers between the network controllers 132-134 (where communications on the control network 124 are less time-stringent). However, this need not be the case.

Figure 5:
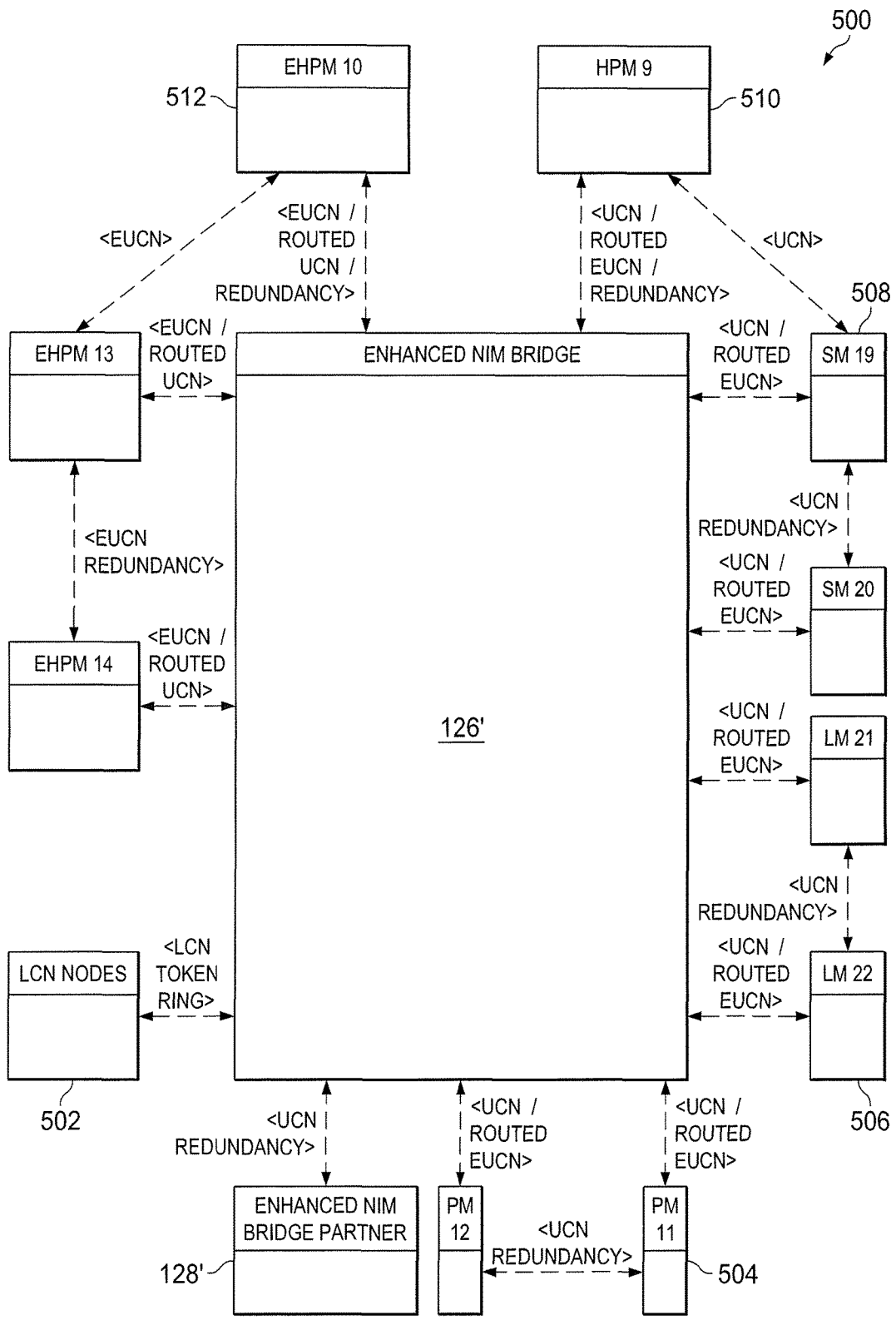

FIG. 5 illustrates an example top-level context model 500 of a portion of a control and automation system that includes the NIM 126'. This context model 500 illustrates various communication paths used in the system and depicts the relationships between the NIM 126' and other devices. Note that specific protocols or networks are shown in FIG. 5, such as LCN, UCN, and enhanced UCN or "EUCN" (which could represent an FTE network). However, these specific protocols are examples only.

As shown in FIG. 5, the NIM 126' communicates with a redundant NIM 128', which could represent the NIM 128 shown in FIG. 1 after updating to include the functionality as the NIM 126'. The NIM 128' could operate in the secondary mode to monitor and synchronize with the NIM 126' while the NIM 126' operates in the primary mode.

The NIM 126' also communicates with various LCN nodes 502 over the supervisory control network 120. The LCN nodes 502 could include the DCS nodes 102-104. Specific examples of LCN nodes 502 include HISTORY MODULES (HMs), APPLICATION MODULES (AMs), and UNIVERSAL STATIONS (USs) from HONEYWELL INTERNATIONAL INC.

The NIM 126' further communicates with various legacy process manager (PM) nodes 504, logic manager (LM) nodes 506, and safety manager (SM) nodes 508 over the legacy control network 122. The PM nodes 504 could include standard token bus process controllers. The LM nodes 506 could include classic UCN token bus controllers. The SM nodes 508 could include classic safety controllers on a UCN token bus.

In addition, the NIM 126' communicates with various high-performance process managers (HPMs) 510 over the control network 122 and enhanced HPMs (EHPMs) 512 over the control network 124. The HPM 510 here represents a legacy device in a redundant pair of devices (such as the process controller 108), while the EHPM 512 here represents an enhanced device in a redundant pair of devices (such as the process controller 110'). The HPM 510 and EHPM 512 communicate via different control networks 122-124, and the NIM 126' supports the concurrent access to these devices. Moreover, various ones of the nodes 504-508 often need to engage in peer-to-peer communications with the HPM 510 and the EHPM 512, and the bridging function of the NIM 126' helps to enable these peer-to-peer communications.

In FIG. 5, the following data types are identified as being used between devices. Note that these data types are for illustration only. "UCN" traffic can denote data contained in IEEE 802.4 token bus frames, which are passed between classic UCN nodes on the control network 122. "EUCN" traffic can denote FTE or other EUCN data contained in IEEE 802.3 Ethernet frames, which are passed between FTE or other EUCN nodes on the control network 124. "Routed UCN" traffic can denote messages received on the control network 122 and retransmitted on the control network 124. "Routed EUCN" traffic can denote messages received on the control network 124 and retransmitted on the control network 122. "UCN Redundancy" can denote messages that are passed on the control network 122 between redundant legacy nodes and can be retransmitted on the control network 124 as EUCN messages. "EUCN Redundancy" can denote messages that are passed over the control network 124 between redundant enhanced nodes and can be retransmitted on the control network 122 as UCN messages. "LCN" can denote messages that are passed to and from the NIM 126' over the control network 120.

Figure 6:
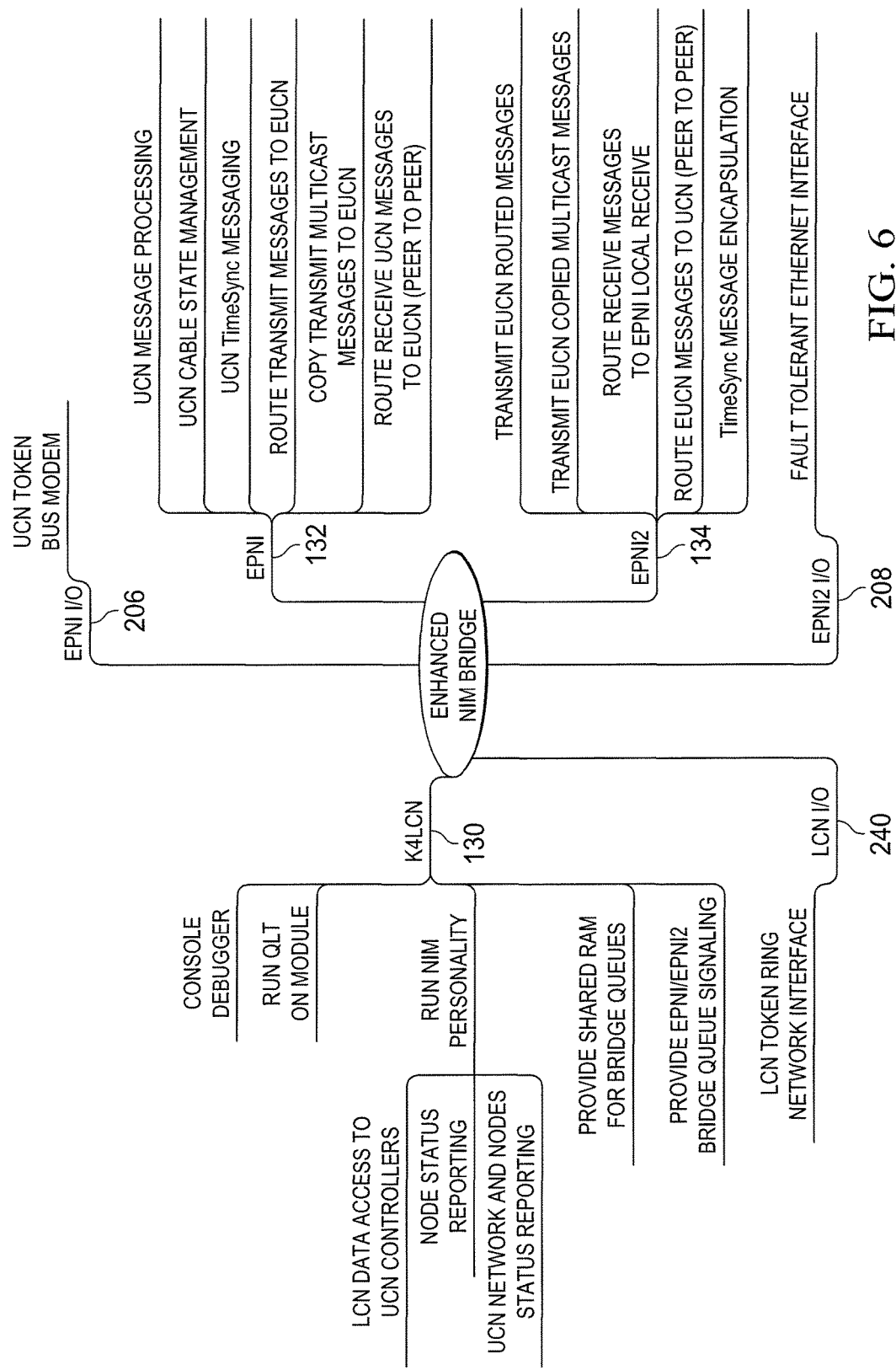

FIG. 6 illustrates an example functional division amongst the network controllers 130-134 within the NIM 126'. Note that specific protocols or networks are shown in FIG. 6, such as LCN, UCN, and EUCN/FTE. However, these specific protocols are examples only.

As shown in FIG. 6, the network controller 130 is implemented here using a K4LCN interface card, and the control network 120 is accessed using an LCN token ring interface. Here, the network controller 130 provides a console debugger, which can be useful during development and debugging. The network controller 130 also supports quality logic testing (QLT) of the NIM 126' and runs the NIM personality 304. In addition, the network controller 130 provides a shared memory (such as the shared memory blocks 410 and 420) and supports interfaces to the network controllers 132-134.

The network controller 132 is implemented here using an EPNI card, and the control network 122 is accessed using a UCN token bus modem. Here, the network controller 132 processes UCN messages, performs UCN cable state management, and supports UCN time synchronization messaging. These are standard functions for UCN devices. The network controller 132 also routes messages for specific enhanced devices to the network controller 134 and copies multicast messages for multiple enhanced devices to the network controller 134. The network controller 132 further routes received UCN messages to the network controller 134 for delivery over the enhanced network 124, thereby supporting peer-to-peer communications via its bridging function.

The network controller 134 is implemented here using another EPNI card, and the control network 124 is accessed using an FTE interface. Here, the network controller 134 routes messages for specific enhanced devices over the enhanced network 124 and multicast messages for multiple enhanced devices over the enhanced network 124. The network controller 134 also routes messages for the control network 120 to the network controller 132. The network controller 134 further routes messages for the control network 122 to the network controller 132, thereby supporting peer-to-peer communications via its bridging function. In addition, the network controller 134 supports the encapsulation of time synchronization information, which can be used to support time synchronization within the enhanced network 124.

Although FIGS. 2 through 6 illustrate one example of a device supporting on-process migration in an industrial process control and automation system, various changes may be made to FIGS. 2 through 6. For example, the specific implementations of the NIM 126' shown here are for illustration only. Various other implementations of the NIM 126', such as those that couple to different types of control networks 120-126, could be supported.

Figure 7:
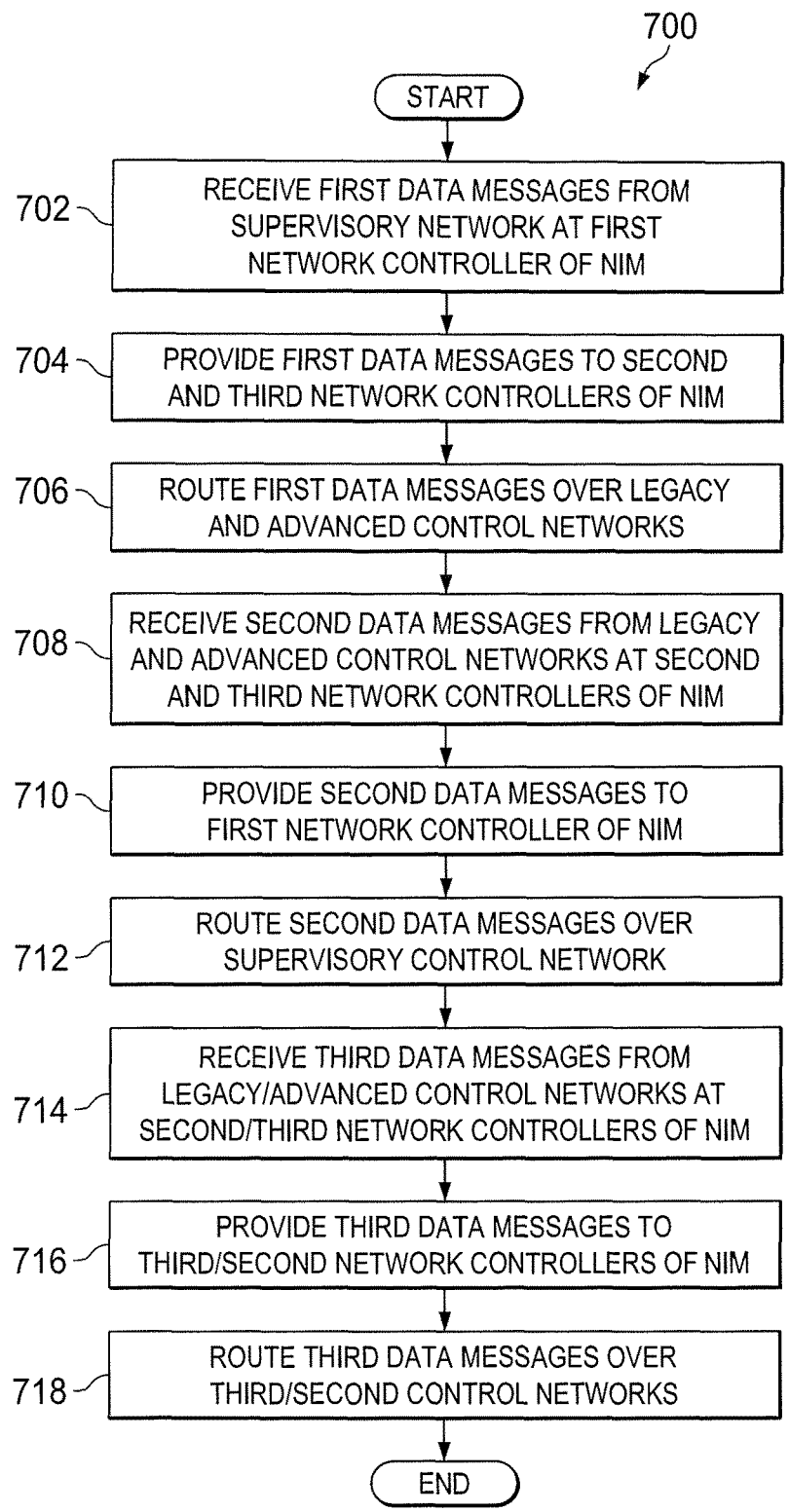
FIG. 7 illustrates an example method for supporting communications between components during an on-process migration in an industrial process control and automation system according to this disclosure.

FIG. 7 illustrates an example method 700 for supporting communications between components during an on-process migration in an industrial process control and automation system according to this disclosure. For ease of explanation, the method 700 is described with respect to the NIM 126' operating in the system of FIG. 1. However, the method 700 could be used by any suitable device and in any suitable system.

As shown in FIG. 7, first data messages are received from a supervisory control network at a first network controller of a NIM at step 702. This could include, for example, the network controller 130 receiving the first data messages from the DCS nodes 102-104 or other higher-level components over the supervisory control network 120. The first data messages are provided to second and third network controllers of the NIM at step 704. This could include, for example, the network controller 130 providing the first data messages to the network controllers 132-134 via the memory blocks 410, 420 of the shared RAM. The first data messages are routed over legacy and enhanced control networks at step 706. This could include, for example, the network controllers 132-134 mapping the addresses of the first data messages into suitable address spaces for the control networks 122-124. This could also include the network controllers 132-134 transmitting the first data messages to the legacy and enhanced process controllers 106-116. In this way, the NIM provides a gateway function and allows higher-level devices to transmit data messages to lower-level devices in the control and automation system.

Second data messages are received from the legacy and enhanced control networks at the second and third network controllers of the NIM at step 708. This could include, for example, the network controllers 132-134 receiving the second data messages from the process controllers 106-116 or other lower-level components over the control networks 122-124. The second data messages are provided to first network controller of the NIM at step 710. This could include, for example, the network controllers 132-134 providing the second data messages to the network controller 130 via the memory blocks 410, 420 of the shared RAM. The second data messages are routed over the supervisory control network at step 712. This could include, for example, the network controller 130 transmitting the second data messages to the DCS nodes 102-104. In this way, the NIM provides a gateway function and allows lower-level devices to transmit data messages to higher-level devices in the control and automation system.

Third data messages are received from the legacy control network or the enhanced control network at the second network controller or the third network controller of the NIM at step 714. This could include, for example, the network controller 132 or 134 receiving the third data messages from the process controllers 106-110 or 112-116 over the control network 122 or 124. The third data messages are provided to the third or second network controllers of the NIM at step 716. This could include, for example, the network controller 132 providing the third data messages to the network controller 134 (or vice versa) via the memory block 420 of the shared RAM. The third data messages are routed over the enhanced control network or the legacy control network at step 718. This could include, for example, the network controller 132 transmitting the third data messages to the process controllers 106-110, or the network controller 134 transmitting the third data messages to the process controllers 112-116. In this way, the NIM provides a bridge function and allows lower-level devices on one control network to exchange data messages with other lower-level devices on another control network in the control and automation system.

Although FIG. 7 illustrates one example of a method 700 for supporting communications between components during an on-process migration in an industrial process control and automation system, various changes may be made to FIG. 7. For example, while shown as a series of steps, various steps in FIG. 7 could overlap, occur in parallel, occur in a different order, or occur multiple times.

Figure 8:
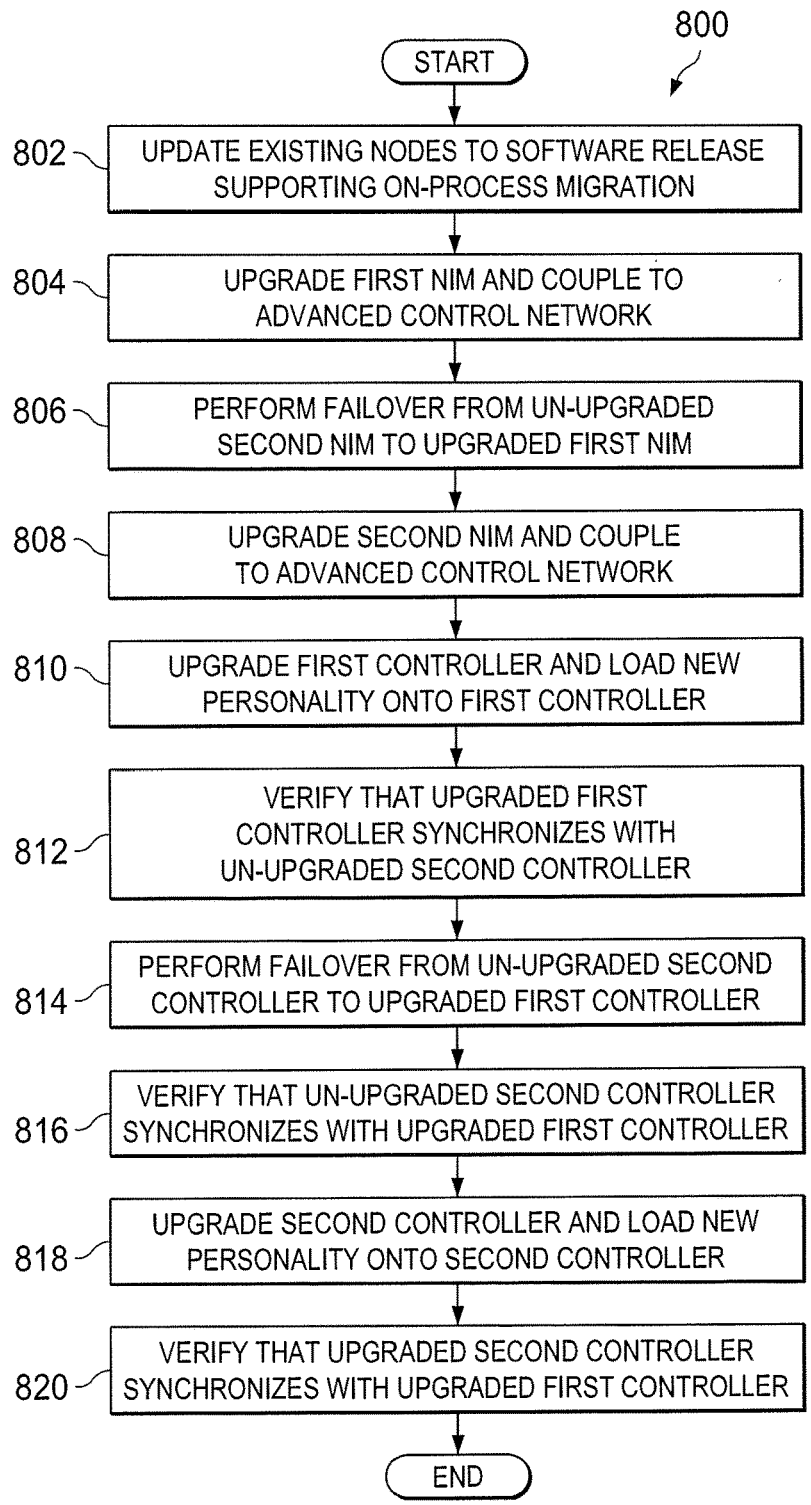
FIG. 8 illustrates an example method for on-process migration in an industrial process control and automation system according to this disclosure.

FIG. 8 illustrates an example method 800 for on-process migration in an industrial process control and automation system according to this disclosure. For ease of explanation, the method 800 is described with respect to the system of FIG. 1. However, the method 800 could be used in any suitable system.

As shown in FIG. 8, existing nodes in an industrial process control and automation system are updated to a software release that supports on-process migration at step 802. The existing nodes represent legacy nodes, such as those coupled to a legacy control network 122 or those coupled to the supervisory control network 120.

A first NIM in a redundant pair of NIMs is upgraded and coupled to an advanced control network at step 804. This could include, for example, installing the network controller 134 in the NIM 126 to create the NIM 126'. This could also include coupling the network controller 134 in the NIM 126' to the control network 124. The NIM being upgraded here denotes the backup NIM in the redundant pair. A failover is performed from an un-upgraded second NIM to the upgraded first NIM at step 806. This could include, for example, causing the NIM 128 to enter the backup mode while the NIM 126' enters the primary mode. The second NIM is upgraded and coupled to the advanced control network at step 808. This could include, for example, installing the network controller 134 in the NIM 128 to create the NIM 128'. This could also include coupling the network controller 134 in the NIM 128' to the control network 124.

A first controller in a redundant pair of controllers is upgraded and a new personality is loaded onto the upgraded first controller at step 810. This could include, for example, installing a new controller module and a new network interface board into the controller 110 and coupling the new interface board to the advanced control network 124. The controller being upgraded here denotes the backup controller in the redundant pair. A verification is made that the upgraded first controller can synchronize with an un-upgraded second controller of the redundant pair at step 812. This could include, for example, verifying that the upgraded first controller 110' (operating in the backup mode) can synchronize with the controller 108 (operating in the primary mode). If so, a failover is performed from the un-upgraded second controller to the upgraded first controller at step 814. This could include, for example, causing the controller 108 to enter the backup mode while the controller 110' enters the primary mode. A verification is made that the un-upgraded second controller can synchronize with the upgraded first controller at step 816. This could include, for example, verifying that the controller 108 (now operating in the backup mode) can synchronize with the controller 110' (now operating in the primary mode). If so, the second controller is upgraded and a new personality is loaded onto the upgraded second controller at step 818, and a verification is made that the upgraded second controller can synchronize with the upgraded first controller at step 820.

Although FIG. 8 illustrates one example of a method 800 for on-process migration in an industrial process control and automation system, various changes may be made to FIG. 8. For example, while shown as a series of steps, various steps in FIG. 8 could overlap, occur in parallel, occur in a different order, or occur multiple times. Also, note that each NIM and controller can be upgraded either by physically updating a legacy NIM or controller or by installing a new NIM or controller. While FIG. 8 indicates that the former option is being used, the latter option is also available. In addition, while the upgrading of controllers is shown in steps 810-820, any suitable legacy device(s) could be upgraded using the technique shown in FIG. 8.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The term "couple" and its derivatives refer to any direct or indirect connection between two or more components. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
  a first network controller configured to communicate over a higher-level industrial process control network;
  a second network controller configured to communicate over a legacy lower-level industrial process control network using a legacy protocol, the second network controller comprising a token bus controller configured to communicate over a token bus of the legacy lower-level industrial process control network;
a third network controller configured to communicate over an enhanced lower-level industrial process control network using an enhanced protocol, the third network controller comprising a token bus controller emulator; and
a housing configured to encase the first, second, and third network controllers;
wherein the first network controller is configured to provide first data messages from the higher-level industrial process control network to the second and third network controllers for transmission over the lower-level industrial process control networks;
wherein the second and third network controllers are configured to provide second data messages from the lower-level industrial process control networks to the first network controller for transmission over the higher-level industrial process control network;
wherein each of the second and third network controllers is configured to provide third data messages from one of the lower-level industrial process control networks to another of the second and third network controllers for transmission over another of the lower-level industrial process control networks; and
wherein at least one of the second and third network controllers is configured to translate the third data messages between the legacy protocol and the enhanced protocol.

2. The apparatus of claim 1, further comprising:
a first physical interface coupled to the first network controller and configured to be coupled to the higher-level industrial process control network;
a second physical interface coupled to the second network controller and configured to be coupled to the legacy lower-level industrial process control network; and
a third physical interface coupled to the third network controller and configured to be coupled to the enhanced lower-level industrial process control network.

3. The apparatus of claim 2, wherein:
the first physical interface is configured to be coupled to a redundant coaxial control network;
the second physical interface is configured to be coupled to a coaxial or redundant coaxial control network; and
the third physical interface is configured to be coupled to an Ethernet network or a redundant Ethernet network.

4. The apparatus of claim 1, further comprising:
a first shared memory block configured to buffer the first and second data messages, the first and second network controllers configured to access the first shared memory block.

5. The apparatus of claim 4, further comprising:
a second shared memory block configured to buffer at least the third data messages, the second and third network controllers configured to access the second shared memory block.

6. The apparatus of claim 1, wherein:
the second network controller comprises logical link control (LLC) firmware configured to route a first portion of the second data messages to the first network controller and to route a first portion of the third data messages to the third network controller; and
the third network controller comprises LLC firmware configured to route a second portion of the second data messages to the first network controller and to route a second portion of the third data messages to the second network controller.

7. The apparatus of claim 1, wherein the apparatus is configured to provide control devices on the higher-level industrial process control network with concurrent access to control devices on the legacy and enhanced lower-level industrial process control networks.

8. The apparatus of claim 1, wherein the first network controller comprises a network interface module (NIM) personality configured to provide a gateway functionality.

9. A method implemented with controllers having processor capabilities and circuitry to process instructions and network inter-communicated data, the method comprising:
receiving first data messages from a higher-level industrial process control network at a first network controller of an interface device;
providing, by the first network controller, the first data messages to second and third network controllers of the interface device for transmission over legacy and enhanced lower-level industrial process control networks, respectively, wherein the second network controller comprises a token bus controller configured to communicate over a token bus of the legacy lower-level industrial process control network, wherein the third network controller comprises a token bus controller emulator;
receiving second data messages from the lower-level industrial process control networks at the second and third network controllers;
providing, by the second and third network controllers, the second data messages to the first network controller for transmission over the higher-level industrial process control network;
receiving, at each of the second and third network controllers, third data messages from one of the lower-level industrial process control networks;
translating, by the second and third network controllers, the third data messages between a legacy protocol associated with the legacy lower-level industrial process control network and an enhanced protocol associated with the enhanced lower-level industrial process control network: and
providing, from each of the second and third network controllers to another of the second and third network controllers, the translated third data messages for transmission over another of the lower-level industrial process control networks;
wherein the first, second, and third network controllers are disposed in a same housing of the interface device.

10. The method of claim 9, wherein the interface device transports the third data messages from the second network controller to the third network controller and from the third network controller to the second network controller.

11. The method of claim 9, further comprising:
coupling a first physical interface of the interface device to the higher-level industrial process control network, the first physical interface coupled to the first network controller;
coupling a second physical interface of the interface device to the legacy lower-level industrial process control network, the second physical interface coupled to the second network controller; and
coupling a third physical interface of the interface device to the enhanced lower-level industrial process control network, the third physical interface coupled to the third network controller.

12. The method of claim 11, wherein:
the first physical interface is coupled to a redundant coaxial control network;

the second physical interface is coupled to a coaxial or redundant coaxial control network; and the third physical interface is coupled to an Ethernet network or a redundant Ethernet network.

13. The method of claim 9, further comprising:

using a first shared memory block to buffer the first and second data messages, the first and second network controllers configured to access the first shared memory block.

14. The method of claim 13, further comprising:

using a second shared memory block to buffer at least the third data messages, the second and third network controllers configured to access the second shared memory block.

15. The method of claim 9, wherein:

the second network controller comprises logical link control (LLC) firmware that routes a first portion of the second data messages to the first network controller and routes a first portion of the third data messages to the third network controller; and the third network controller comprises LLC firmware that routes a second portion of the second data messages to the first network controller and routes a second portion of the third data messages to the second network controller.

16. The method of claim 9, further comprising:

providing control devices on the higher-level industrial process control network with concurrent access to control devices on the legacy and enhanced lower-level industrial process control networks using the interface device.

17. A system comprising:

first, second, and third network controllers configured to communicate over higher-level, legacy lower-level, and enhanced lower-level industrial process control networks, respectively; wherein the second network controller comprises a token bus controller configured to communicate over a token bus of the legacy lower-level industrial process control network, wherein the third network controller comprises a token bus controller emulator;

at least one processing device configured to provide a gateway function to allow data messages to be transported between (i) the higher-level industrial process control network and (ii) the lower-level industrial process control networks, wherein the second and third network controllers are configured to provide a bridge function to allow data messages to be transported between (i) the legacy lower-level industrial process control network and (ii) the enhanced lower-level industrial process control network;

a bus configured to transport the data messages between the network controllers; and a housing configured to encase the network controllers, the at least one processing device, and the bus, wherein the first network controller is configured to provide data messages from the high-level industrial process control network to the second and third network controllers for transmission over the lower-level industrial process control networks, and to receive from lower-level industrial process control networks data messages provided by the second and third network controllers;

wherein at least one of the second and third network controllers is configured to receive data messages from lower-level control networks to another of the second and third network controllers for transmission over other lower-level industrial control networks; and translate at least some of the data messages between a legacy protocol associated with the legacy lower-level industrial process control network and an enhanced protocol associated with the enhanced lower-level industrial process control network.

18. The system of claim 17, wherein:

the second network controller further comprises:

logical link control (LLC) firmware configured to route a first portion of the data messages to the first and third network controllers; and the third network controller further comprises:

LLC firmware configured to route a second portion of the data messages to the first and second network controllers.

19. The system of claim 17, further comprising:

a first physical interface coupled to the first network controller and configured to be coupled to the higher-level industrial process control network;

a second physical interface coupled to the second network controller and configured to be coupled to the legacy lower-level industrial process control network; and a third physical interface coupled to the third network controller and configured to be coupled to the enhanced lower-level industrial process control network.

20. The system of claim 17, wherein the first network controller comprises a network interface module (NIM) personality configured to provide a gateway functionality.

* * * * *